United States Patent
Fidan et al.

(10) Patent No.: US 10,208,407 B2
(45) Date of Patent: Feb. 19, 2019

(54) HIGH TENACITY LOW EXTENSIBLE NYLON 6.6 CORD

(71) Applicant: KORDSA TEKNIK TEKSTIL ANONIM SIRKETI, Kocaeli (TR)

(72) Inventors: Saadettin Fidan, Istanbul (TR); Kursat Aksoy, Kocaeli (TR)

(73) Assignee: KORDSA TEKNIK TEKSTIL ANONIM SIRKETI, Kocaeli (TR)

( * ) Notice: Subject to any disclaimer, the term of this patent is extended or adjusted under 35 U.S.C. 154(b) by 0 days.

(21) Appl. No.: 15/740,001

(22) PCT Filed: Jan. 22, 2016

(86) PCT No.: PCT/TR2016/050015
§ 371 (c)(1),
(2) Date: Dec. 27, 2017

(87) PCT Pub. No.: WO2017/127032
PCT Pub. Date: Jul. 27, 2017

(65) Prior Publication Data
US 2018/0187344 A1    Jul. 5, 2018

(51) Int. Cl.
*D02G 3/48* (2006.01)
*D01F 6/60* (2006.01)
*B60C 9/00* (2006.01)

(52) U.S. Cl.
CPC ............ *D02G 3/48* (2013.01); *B60C 9/0042* (2013.01); *D01F 6/60* (2013.01)

(58) Field of Classification Search
CPC .................................. D02G 3/28; D02G 3/48
See application file for complete search history.

(56) References Cited

U.S. PATENT DOCUMENTS

| | | | |
|---|---|---|---|
| 3,849,976 A | 11/1974 | Kenyon | |
| 3,850,219 A | 11/1974 | Snyder | |
| 3,960,628 A | 6/1976 | Snyder | |
| 3,977,172 A * | 8/1976 | Kerawalla | B60C 9/0042 57/237 |
| 4,284,117 A | 8/1981 | Poque et al. | |
| 4,877,073 A * | 10/1989 | Thise | B60C 9/0042 152/451 |
| 5,115,853 A | 5/1992 | Oare et al. | |
| 5,908,520 A | 6/1999 | Kodama | |
| 6,609,552 B2 | 8/2003 | Miyazaki et al. | |
| 2009/0090447 A1 * | 4/2009 | Baldwin, Jr. | B60C 9/0042 152/451 |
| 2015/0292124 A1 | 10/2015 | Lee et al. | |
| 2017/0327977 A1 * | 11/2017 | Cornille | D02G 3/48 |
| 2017/0327978 A1 * | 11/2017 | Cornille | B60C 9/0042 |
| 2018/0186185 A1 * | 7/2018 | Fidan | B60C 1/0016 |

FOREIGN PATENT DOCUMENTS

WO   2015105104 A1   7/2015
WO   2015137901 A1   9/2015

OTHER PUBLICATIONS

Ayse Aytac, Berrin Yilmaz, Veli Deniz, "Effect of Twist Level on Tyre Cord Performance", Fibers and Polymers, vol. 10, No. 02, Jan. 20, 2009.

* cited by examiner

*Primary Examiner* — Shaun R Hurley
(74) *Attorney, Agent, or Firm* — Gokalp Bayramoglu

(57) ABSTRACT

A two or three-ply nylon 6.6 cord having a breaking elongation of 8 to 12% and a minimum tenacity of 9 g/dtex is disclosed in the present invention. The two or three-ply nylon 6.6 cord is used as tire reinforcement, in particular as cap ply spirally wound on belt package with 0° to 5° to the equatorial plane of the radial pneumatic tire.

4 Claims, No Drawings

HIGH TENACITY LOW EXTENSIBLE NYLON 6.6 CORD

CROSS REFERENCE TO RELATED APPLICATIONS

This application is the national phase entry of International Application No. PCT/TR2016/050015, filed on Jan. 22, 2016, the entire content of which is incorporated herein by reference.

TECHNICAL FIELD

This invention relates to two and three-ply nylon 6.6 cords having improved properties, more particularly with reduced extensibility and increased tenacity as cap ply reinforcement in pneumatic radial tires.

BACKGROUND OF THE INVENTION

It is well known that cap ply reinforcements spirally wound on the belt package with 0° to 5° to the equatorial plane of the tire improves performance and high speed durability of the tire. Nylon 6.6 has been using widely for several years as cap ply due to its high restraining force at high speed conditions, preventing or reducing tire growth and belt edge separations.

In U.S. Pat. No. 4,284,117, belted pneumatic tires characterized by improved tread reinforcing breaker constructions are disclosed. In such applications, the cap ply is disposed directly on the radially outermost belt ply of the tire. Since the cap ply is formed from single twisted yarns rather than cords, the cap ply is thinner than conventional cap plies, has superior flexibility and heat dissipation characteristics. The textile yarns are oriented at a 0° angle to the median equatorial plane of the tire. In this patent exists no information about material properties.

In U.S. Pat. No. 3,849,976 high strength, high modulus and low heat shrinkage nylon 66 cord has been disclosed as tire reinforcement. In such applications nylon 6.6 cord has L5 modulus higher than 60 g/d.100% (54 g/dtex.100%). But such cords have relatively low heat shrinkage (less than 4%) to generate sufficient shrink force to compensate the modulus-drop of the cap ply cord at high speed temperatures of the crown area in the tire and too stiff for sufficient bending fatigue resistance.

In U.S. Pat. No. 3,850,219 and U.S. Pat. No. 3,960,628 nylon cap ply has been mentioned, but no information on tensile and thermal properties of the cord is given.

In U.S. Pat. No. 5,115,853 low-denier (420 dx2) nylon cords having maximum 7 tpi (276 tpm) twist have been disclosed as cap ply. The cap ply(overlay) cord have an elongation at break of 15% to 20%. The heat shrinkage properties of the cap ply cords are not mentioned. In U.S. Pat. No. 5,908,520 and U.S. Pat. No. 6,609,552 single twisted nylon 66 yarns have been disclosed as cap ply in tire.

SUMMARY OF THE INVENTION

Nylon 6.6 cap ply reinforcements spirally wound on the belt package in high performance tires improve high speed durability and handling characteristics. Nylon 6.6 cap ply cords generate restraining force against tire growth under high speed conditions due to centrifugal force caused by heavy belt package and tread.

In principle, the three important cord parameters enhancing the restraining force are:
1—Modulus or LASE
2—Shrink force at high speed crown area temperature of the tire
3—Residual tension of cap ply cords in tire All of the three parameters affecting the restraining force of the cap ply cords are controlled dominantly by elongation at break value of the nylon 6.6 cord for a constant cord twist. Higher cord stretching at high temperature during heat-setting process generally results in reduced elongation at break, but at the same time increased modulus and thermal shrink force. Due to the lifting process during curing process of the tire higher modulus cap ply cords generates higher tension upon diameter expansion. According to the invention, the cap ply cords having elongation at break values of 8% to 12% give enhanced tire performance. The modulus (including initial modulus too) and thermal shrink force nylon 6.6 cords having higher than 12% elongation at break value are not sufficiently high enough, that's why cap ply layer contain high amount of nylon 6.6 (two or three layers) which cause significant level of flatspotting in tire. When the elongation at break value is less than 8%, the nylon 6.6 cap ply cords become too stiff for sufficient bending and compression fatigue resistance.

DETAILED DESCRIPTION OF THE INVENTION

The cap ply layer comprising nylon 6.6 cords arranged side by side at 0° to 5° with respect to the equatorial plane of the tire, each of said cords consisting of two or three yarns twisted together and each cap ply cord has minimum 9 grams/dtex (10 g/denier) tenacity and elongation at break value of 8% to 12%. The tensile properties are determined according to ASTM D885 but cords are not allowed to absorb moisture from the testing environment by treating it hydrophobic substances like liquid oils. The maximum allowable moisture content of the cord during testing is 0.5%. Such cord properties means, in case of 8 to 12% elongations, cords exert their maximum resistance (minimum 9 g/dtex) against tire growth before breaking. The shorter or reduced breaking elongation means also higher modulus and LASE values than conventional nylon cords having 15 to 25% elongation at break values. In order to obtain such properties, the cords are stretched in heat-setting ovens minimum 25% at 250 to 260° C. in 5 to 30 seconds exposure times. High level orientation of the nylon 6.6 molecules during hot stretching process increases also breaking strength (tenacity) of the cords. Such cords having high molecular orientation due to high stretching at high temperatures have also heat shrinkage values of 7.0 to 8.5% according to ASTM D885(under 0.05 gram/denier or 0.045 g/dtex cord pretension, after exposing two minutes to 177° C. in TESTRITE shrinkage measuring apparatus). According to the invention, preferred total linear density of the cords is from 400 dtex to 5,000 dtex. According to the invention, the twist factor of the cords is from 5,000 to 15,000 which can be calculated according to the following formula:

TWIST FACTOR=twist (tpm)×√(total nominal cord dtex)

Definitions

Cap ply: A belt reinforcing layer placed between tread and top layer of the belt package.

Cord: Means a cable formed by twisting together two or more plied yarns

Denier: The weight in grams per 9,000 meters (unit for expressing linear density)

Dtex: The weight in grams per 10,000 meters (unit for expressing linear density)

Equatorial plane (EP): The plane perpendicular to the tire's axis of rotation and passing through the center of its tread.

Heat-set cord linear density: Real linear density determined by weighing sample cord including adhesive dip layer on it.

LASE: Load at specified elongation

L5 Modulus: The load required to stretch the cord by 5% multiplied by 20 and divided by cord denier or dtex.

Modulus: Stress divided by strain, resistance to deformation

Nominal cord linear density: Sum of the initial yarn linear densities of the cord (e.g. 1880 dtex for 940×2 cord construction)

Radial tire: A belted or circumferentially restricted pneumatic tire in which the body ply or carcass cords which extend from bead to bead are laid at cord angles between 65° and 90° with respect to the equatorial plane of the tire.

Restrainig force: The force applied by cap ply cords on belt package to resist centrifugal force generated under high speed conditions.

Tenacity: Breaking force divided by cord linear density (as g/dtex or g/denier)

tpm: Number of turns per meter

What is claimed is:

1. A cap ply cord for tire reinforcement, the cap ply cord comprising two plies or three plies, wherein each individual ply consists essentially of a polyamide 6.6 yarn initially pretwisted in a first direction and the plies are finally twisted together in a second direction; wherein the first direction and the second direction are opposite to one another,
    wherein an elongation at break value of the cap ply cord is between 8% and 12% determined by ASTM D885, with a maximum moisture content of 0.5%; and
    wherein the cap ply cord has a minimum tenacity value of 9 g/dtex (10 g/denier), wherein the minimum tenacity value is based on a real linear density of the cap ply cord.

2. The cap ply cord for tire reinforcement according to claim 1, wherein a heat shrinkage value of the cap ply cord is higher than 7.0% and less than 8% wherein the heat shrinkage value is determined at 177° C. with a pretension of 0.045 g/dtex after an exposure time of 2 minutes in a heating zone of TESTRITE shrinkage apparatus.

3. The cap ply cord for tire reinforcement according to claim 1, wherein a nominal cord linear density of the cap ply cord is between 1,400 and 5,000 dtex.

4. The cap ply cord for tire reinforcement according to claim 1, wherein a twist factor of the cap ply cord is between 5,000 and 15,000.

* * * * *